(12) United States Patent
Priepke

(10) Patent No.: US 8,459,921 B2
(45) Date of Patent: Jun. 11, 2013

(54) BALE WAGON UNLOADING/PUSH-OFF SYSTEM

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 399 days.

(21) Appl. No.: 12/840,342

(22) Filed: Jul. 21, 2010

(65) Prior Publication Data

US 2012/0020761 A1 Jan. 26, 2012

(51) Int. Cl.
*A01D 90/08* (2006.01)

(52) U.S. Cl.
USPC ......... 414/111; 414/704; 414/789.4; 414/517

(58) Field of Classification Search
USPC ............... 414/111, 198, 395, 492, 501, 509, 414/513, 517, 522, 704, 789.2, 789.3, 789.4, 414/789.7, 790.3
See application file for complete search history.

(56) References Cited

U.S. PATENT DOCUMENTS

| | | | | |
|---|---|---|---|---|
| 2,671,570 A | * | 3/1954 | Richey | 414/704 |
| 2,848,127 A | * | 8/1958 | Grey | 414/789.3 |
| 3,373,882 A | * | 3/1968 | Forest | 414/789.3 |
| 3,583,578 A | | 6/1971 | Fachini et al. | |
| 3,625,376 A | | 12/1971 | McWilliams | |
| 3,788,495 A | * | 1/1974 | Fachini et al. | 414/789.4 |
| 3,902,608 A | | 9/1975 | Butler et al. | |
| 3,918,595 A | | 11/1975 | Godfrey et al. | |
| 4,370,796 A | | 2/1983 | Wilson | |
| 4,534,691 A | | 8/1985 | Miguel | |
| 5,314,290 A | * | 5/1994 | Lutz et al. | 414/509 |
| 5,607,274 A | * | 3/1997 | Cook | 414/111 |
| 5,899,652 A | * | 5/1999 | Graham | 414/24.5 |
| 5,984,606 A | * | 11/1999 | Meeks | 414/24.5 |
| 6,220,811 B1 | | 4/2001 | Bernecker | |
| 6,972,653 B2 | * | 12/2005 | Czeppel et al. | 335/220 |
| 6,997,663 B2 | | 2/2006 | Siebenga | |

FOREIGN PATENT DOCUMENTS

| | | |
|---|---|---|
| DE | 003316864 A1 | 11/1984 |
| DE | 4436706 A1 | 10/1994 |
| WO | 8607234 A1 | 12/1986 |

* cited by examiner

*Primary Examiner* — Gregory Adams
(74) *Attorney, Agent, or Firm* — Patrick M. Sheldrake

(57) ABSTRACT

A system for unloading bales from a bale wagon including a mobile trailer frame and a bed frame pivotably movable with respect to the trailer frame between a first position for receiving bales and a second position for unloading bales. A push-off member is provided for pushing bales off of the bed frame when the bed frame is in the second position. A pushing device is connected to the trailer frame. The push-off member is selectably connectable to the pushing device when the bed frame is in the second position. The push-off member is disconnected from the pushing device when the bed frame is not in the second position.

19 Claims, 3 Drawing Sheets

BALE WAGON UNLOADING/PUSH-OFF SYSTEM

FIELD OF THE INVENTION

The present invention relates generally to agricultural machinery for use with crop harvesting devices. It relates more particularly to a system for unloading bales from a bale wagon.

BACKGROUND OF THE INVENTION

It is common practice to utilize a bale wagon to move bales to a desired location and then subsequently deposit the formed stack of bales upon the ground or in a covered structure. In order to safely deposit the stack of bales upon the ground, especially large rectangular bales typically weighing hundreds of pounds, mechanical assistance is needed. Bale removal is further complicated when the bales are to be used for silage, typically adding weight and having a higher coefficient of friction associated with pushing the bales off of the bale wagon. Further complicating matters is the extended stroke distance that a pushing device must travel in order to achieve the task of pushing off bales from the bale wagon, as the pushing device can buckle. Finally, known pushing devices are incapable of pushing multiple tiers or a stack of bales from the bale wagon.

What is needed is a system that for unloading bales from a bale wagon without the above-mentioned disadvantages.

SUMMARY OF THE INVENTION

The present invention relates to a system for unloading bales from a bale wagon including a mobile trailer frame and a bed frame pivotably movable with respect to the trailer frame between a first position for receiving bales and a second position for unloading bales. A push-off member is provided for pushing bales off of the bed frame when the bed frame is in the second position. A pushing device is connected to the trailer frame. The push-off member is selectably connectable to the pushing device when the bed frame is in the second position. The push-off member is disconnected from the pushing device when the bed frame is not in the second position.

The present invention further relates to a system for unloading bales from a bale wagon including a mobile trailer frame and a bed frame pivotably movable with respect to the trailer frame between a first position for receiving bales and a second position for unloading bales. A push-off member substantially spans a width of the bed frame for pushing bales off of the bed frame when the bed frame is in the second position. A hydraulic ram is connected to the trailer frame. The push-off member is selectably connectable to the hydraulic ram when the bed frame is in the second position. The push-off member is disconnected from the hydraulic ram when the bed frame is not in the second position.

An advantage of the present invention is a bale wagon having a reduced size and complexity, while having the capability of unloading bales having increased weight from the wagon.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
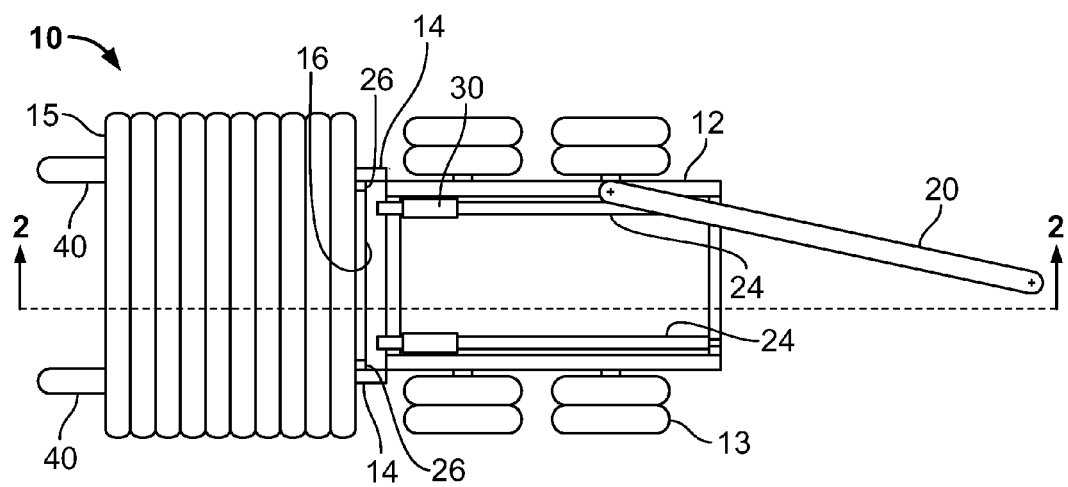
FIG. 1 is a top view of an embodiment of a bale.
Figure 2:
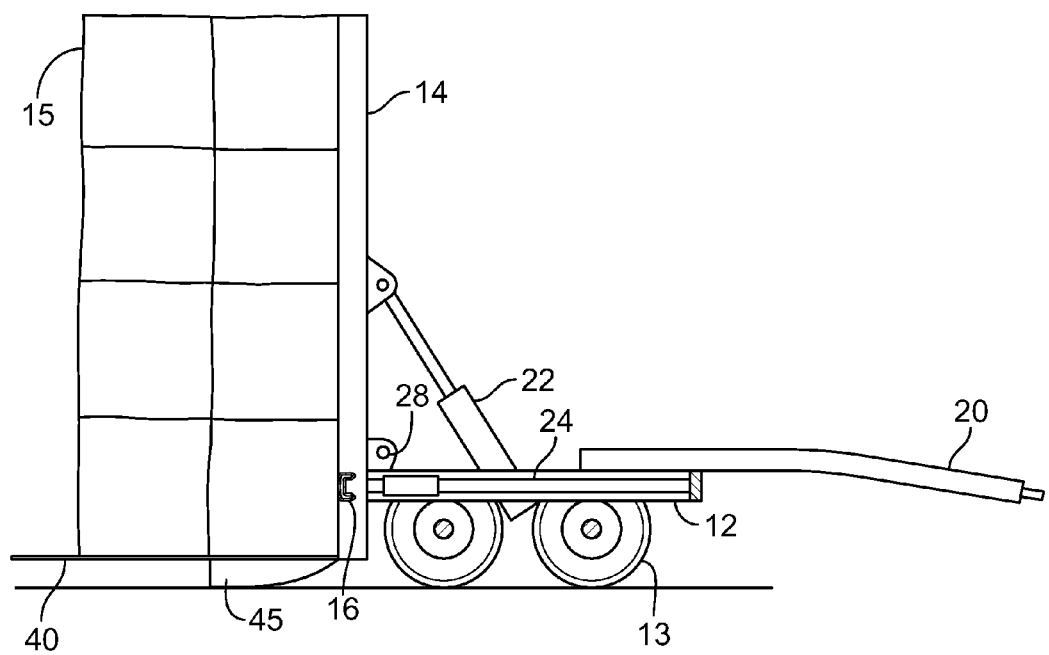
FIG. 2 is a cross section taken along line 2-2 of FIG. 1.
Figure 3:
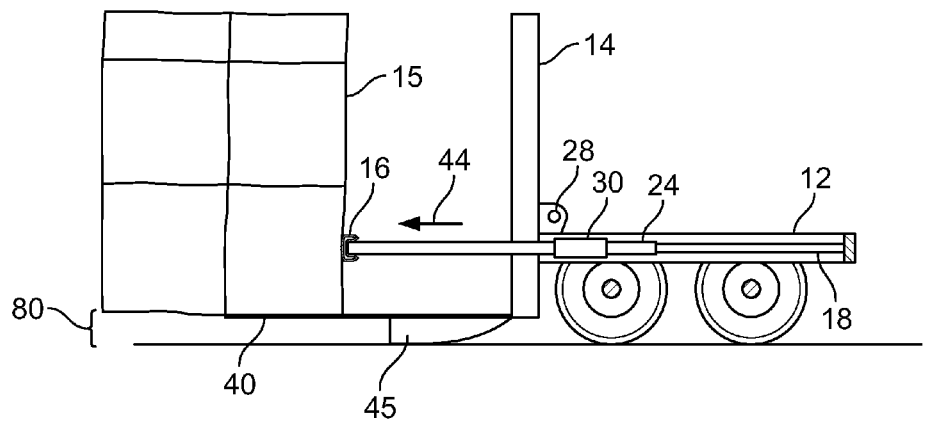
FIG. 3 is a side view of bales partially removed from the wagon of FIG. 2.

Referring to FIGS. 1-3, a bale wagon 10 includes a mobile trailer frame 12 supported by a plurality of wheels 13 that is pulled by a tongue 20 secured to the frame by an agricultural vehicle (not shown), such as a tractor. A pushing device 22 such as a hydraulic ram rotates a bed frame 14 about a pivot 28 with respect to trailer frame 12 between a first position for receiving bales 15 and a second position for unloading the bales. Bales 15 that may be loaded onto the bale wagon can range in size from those reasonably capable of manual manipulation/removal from the bale wagon, to those weighing hundreds of pounds, and typically referred to as "large bales". Bales 15 may be loaded on the wagon to form a stacked tier or tiers of bales. FIGS. 1-3 and 5 show the bale wagon 10 in the second position. As further shown in FIG. 2, and in the second position for unloading the bales, bed frame 14 extends substantially vertically and includes a backstop 40 extending substantially horizontally to support the weight of the bales 15 as the bales are being unloaded from the wagon. In one embodiment, backstop 40 includes a plurality of tines and may further include a skid plate 45 positioned near pivot 28 between bed frame 14 and trailer frame 12 to maintain a spacing 80 between the backstop and the ground to permit the bales 15 to be installed in a storage bag (not shown) when pushed off of the bale wagon, if desired.

FIGS. 1-4 show a push-off member 16 for pushing bales 15 off of the bed frame 14 when the bed frame is in the second position. In one embodiment, push-off member 16 resembles a hollow C-shaped structure, although other profiles may be utilized. As further shown in FIG. 1, push-off member 16 substantially spans a width of trailer frame 12, applying a push-off force provided by a pushing device 18 (FIG. 3) to a first tier of bales 15. In one embodiment, for bed frame 14 positions other than the second position, push-off member 16 is in a seated position and is disconnected from pushing device 18 to provide clearance for pivoting movement between bed frame 14 and trailer frame 12. Pushing device 18, such as a hydraulic ram or a rotating threaded rod or similar device, provides a force applied in direction 44 (FIG. 3) urging push-off member 16 to remove bales from the bale wagon. Conversely, actuating pushing device 18 in a direction opposite direction 44, such as after the bales have been pushed off the wagon, urges push-off member 16 toward trailer frame 12 (toward a retracted position of the pushing device).

Figure 4:
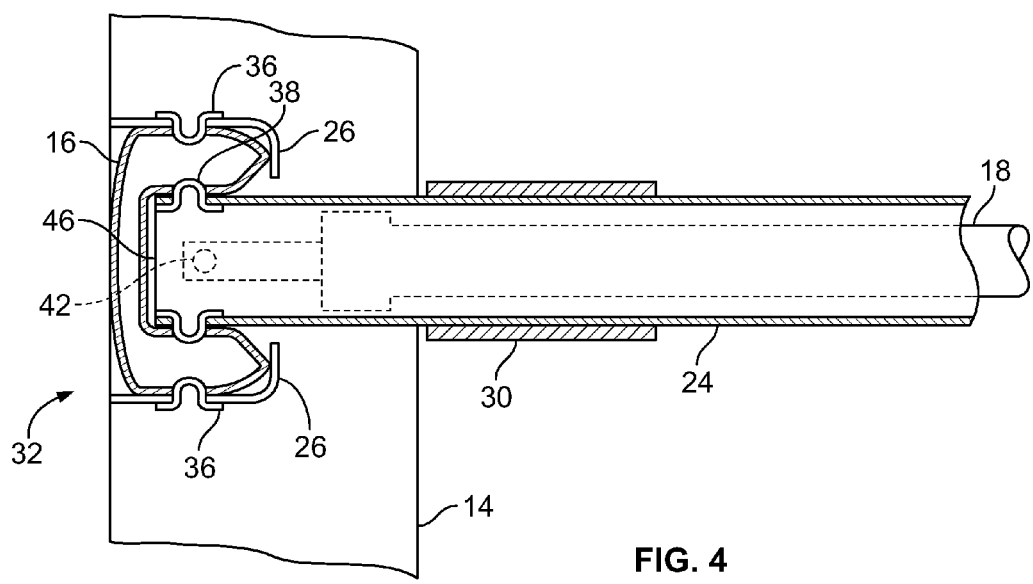
FIG. 4 is an enlarged, partial cross section of a push-off member taken along line 2-2 of FIG. 1.

As further shown in FIG. 4, push-off member 16 rests or is "seated" in a retention member or seating member 26, which as shown, resembles a pair of L-brackets secured to facing inside surfaces of opposed structural members of bed frame 14, although other constructions may be used. That is, retention member or seating member 26 is configured to substantially prevent relative movement between push-off member 16 and bed frame 14. In one embodiment, push-off member 16 is maintained in a substantially flush or recessed position with respect to the bed frame 14 surface on which bales 15 are placed, when the bed frame is in the first (bale loading) position. Push-off member 16 may be secured in its seated position and in close proximity to seating member 26 by a retention feature 36, such as a detent. The detent includes a flexible segment of material that is secured to an outside surface of seating member 26 and protrudes through an opening formed in seating member 26. Upon alignment of the opening formed in seating member 26 with a corresponding opening formed in push-off member 16, retention feature 36 protrudes through both aligned openings to secure push-off member 16 in the seated position. It is to be understood that a detent may be positioned differently than as described herein and that other embodiments of retention features, may be utilized, such as a spring-loaded retractable ball or the like.

As further shown in FIG. 4, opposed retention features 36 may be utilized to secure push-off member 16 in its seated position. FIG. 4 further shows end 46 of tube 24 in abutting contact with push-off member 16 in which push-off member 16 is maintained in close proximity to end 46 by a retention feature 38, such as a detent that may be secured to either push-off member 16 or to tube 24. In one embodiment, pushing device 18 is secured to tube 24 by a pin connection 42. That is, as shown in FIG. 4, the detent 38 includes a flexible segment of material that may be secured to an inside surface of tube 24 and protrudes through an opening formed in tube 24. Upon alignment of the opening formed in tube 24 with a corresponding opening formed in push-off member 16, retention feature 38 protrudes through both aligned openings to secure push-off member 16 to tube 24. It is to be understood that a detent may be positioned differently than as described herein and that other embodiments of retention features, may be utilized such as a spring-loaded retractable ball or the like.

In one embodiment, the force required to dislodge detent 38, resulting in the disconnection between tube 24 and push-off member 16, is less than the force required to dislodge detent 36, resulting in the disconnection between seating member 26 and push-off member 16. Under normal operating conditions, push-off member 16 is always secured to either seating member 26 or to tube 24 at any given time (and may be secured to both seating member 26 and to tube 24 simultaneously when bed frame 14 is in the second position). That is, when bed frame 14 is in the first position or between the first position and the second position, push-off member 16 is in its seated position, i.e., in close proximity with seat member 26 and also disconnected from tube 24. In other words, tube 24 is in a retracted position to permit pivoting movement between trailer frame 12 and bed frame 14.

However, once bed frame 14 is in the second position, tube 24 may also be brought into abutting contact or in connection with push-off member 16 by actuation of pushing device 18. In one instance, as shown by FIG. 4, both detents 36, 38 are secured to push-off member 16. That is, push-off member 16 is still in its seated position, but is also in abutting contact with tube 24. Upon additional force applied along direction 44 (FIG. 3), push-off member 16 is dislodged from its seated position with seat member 26 to unload bales from the wagon. That is, push-off member 16 is brought into abutting contact with and urges bales 15 to begin to slide over backstop 40 away from seat member 26.

Pushing device 18, which is secured to trailer frame 12 at one end, is secured to tube 24 at the other end, such as by pin connection 42 (FIG. 4), the tube moving with respect to the trailer frame 12 during operation of the pushing device. In one embodiment, when pushing device 18 is in a refracted position, such as shown in FIG. 2, tube 24 substantially surrounds and covers the pushing device. Tube 24 helps protect pushing device 18, and helps prevent buckling of the pushing device, especially when used with a guide 30 that is secured to trailer frame 12. Tube 24 may additionally help prevent buckling of pushing device 18, if the cross sectional area as measured along the tube is only slightly larger than the cross sectional area of the pushing device. In one embodiment, guide 30 is a tube within which the tube 24 of pushing device 18 slides.

Figure 5:
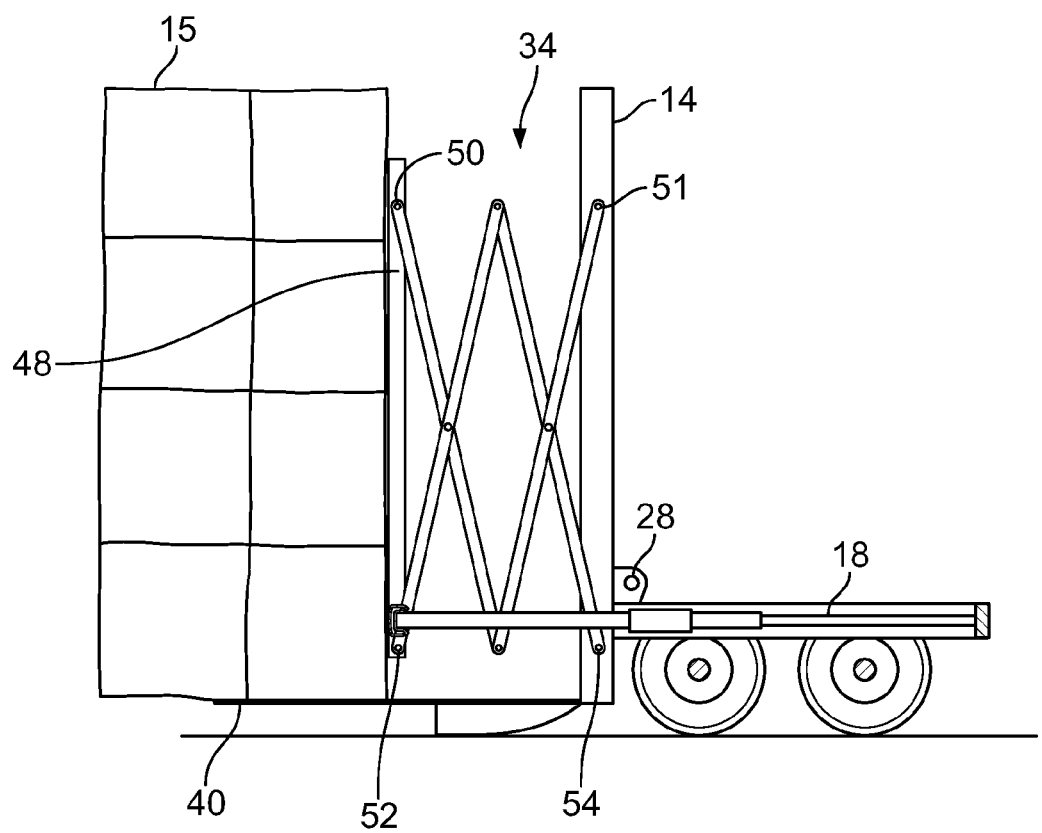
FIG. 5 is a side view of an embodiment of a push-off member.

FIG. 5 shows an exemplary embodiment of the pushing device to include a vertical push-off assembly 34, such as a scissor linkage. Vertical push-off assembly 34 permits multiple tiers of bales 15 to be pushed simultaneously, with the primary load borne by pushing device 18. That is, vertical member 48 simultaneously abuts multiple tiers of bales 15, providing a more secure and stable platform from which to move the bales. In one embodiment the vertical push-off assembly 34 includes pin linkages 52, 54 with respective vertical member 48 and bed frame 14, respectively, and rollers 50, 51 configured to slidably move in bed frame 14 and vertical member 48, respectively. Due to the multiple tiers of bales 15 being pushed primarily by pushing device 18, the structural cross sectional size of the members comprising the vertical push-off assembly 34 may be significantly reduced. For example, at least portions of the linkages of vertical push-off assembly 34 may be composed of substantially flattened metal material, sometimes referred to as a leaf spring, which significantly reduces the weight of the assembly. In one embodiment, the only structural member connected to opposed members 48 of push-off assembly 34 is push-off member 16.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for unloading and pushing-off bales from a bale wagon comprising:
   a mobile trailer frame;
   a bed frame pivotably movable with respect to the trailer frame between a first position for receiving bales and a second position for unloading bales;
   a push-off member for pushing bales off of the bed frame when the bed frame is in the second position; and
   a pushing device connected to the trailer frame;
   the push-off member being selectably connectable to the pushing device when the bed frame is in the second position;
   the push-off member being selectably disconnected from the pushing device prior to the bed frame pivoting from the second position toward the first position such that the push-off member moves with the bed frame during rotation toward the first position.

2. The system of claim 1, wherein the push-off member is secured to the bed frame for movement therewith separately of the pushing device during rotation of the bed frame toward the first position.

3. The system of claim 1, wherein the push-off member is secured to the bed frame by placement in a seated position when the push-off member is not in the second position.

4. The system of claim 3, wherein the seated position includes a seating member mounted to the bed frame and configured to substantially prevent relative movement between the push-off member and the bed frame when engaged.

5. The system of claim 4, wherein the push-off member is selectively connected with each of the seating member and the pushing device when the bed frame is in the second position.

6. The system of claim 5, wherein the push-off member remains in connection with the seating member when the pushing device is in a retracted position.

7. The system of claim 1, wherein the push-off member is connected to a vertical push-off assembly.

8. The system of claim 7, wherein the vertical push-off assembly comprises a scissor linkage.

9. The system of claim 1, wherein the pushing device is a hydraulic ram.

10. The system of claim 9, wherein an end of the pushing device is contained in a tube, the tube moving with respect to the trailer frame during operation of the pushing device.

11. The system of claim 10, wherein the bed frame includes a guide for providing guided slidable movement of the tube.

12. The system of claim 11, wherein the guide is a tube within which the pushing device tube slides.

13. A system for unloading and pushing-off bales from a bale wagon comprising:
  a mobile trailer frame;
  a bed frame pivotably movable with respect to the trailer frame between a first position for receiving bales and a second position for unloading bales;
  a push-off member substantially spanning a width of the bed frame for pushing bales off of the bed frame when the bed frame is in the second position; and
  a hydraulic ram connected to the trailer frame;
  the push-off member being selectably connectable to the hydraulic ram when the bed frame is in the second position;
  the push-off member being selectably disconnected from the hydraulic ram prior to the bed frame pivoting from the second position toward the first position and;
  wherein an end of the pushing device is contained in a tube, the tube moving with respect to the trailer frame during operation of the pushing device.

14. The system of claim 13, wherein the push-off member is secured in a seated position when the push-off member is not in the second position.

15. A system for unloading and pushing-off bales from a bale wagon comprising:
  a mobile trailer frame;
  a bed frame pivotably movable with respect to the trailer frame between a first position for receiving bales and a second position for unloading bales;
  a push-off member substantially spanning a width of the bed frame for pushing bales off of the bed frame when the bed frame is in the second position; and
  a hydraulic ram connected to the trailer frame;
  the push-off member being selectable connectable to the hydraulic ram when the bed frame is in the second position;
  the push-off member being selectably disconnected from the hydraulic ram prior to the bed frame pivoting a from the second position toward the first position
  the push-off member is secured in a seated position when the push-off member is not in the second position; and
  wherein the seated position includes a retention member configured to substantially prevent relative movement between the push-off member and the bed frame.

16. The system of claim 14, wherein the push-off member is selectively connected with each of the retention member and the pushing device when the bed frame is in the second position.

17. The system of claim 16, wherein the push-off member remains in connection with the retention member when the pushing device is in a retracted position.

18. The system of claim 13, wherein the push-off member is connected to a vertical push-off assembly comprising a scissor linkage.

19. The system of claim 13, wherein the bed frame includes a guide for providing guided slidable movement of the tube.

* * * * *